United States Patent
Anderson et al.

(10) Patent No.: US 11,135,568 B1
(45) Date of Patent: Oct. 5, 2021

(54) METHODS OF REGENERATING MOLECULAR SIEVES, AND RELATED SYSTEMS

(71) Applicant: POET Research, Inc., Sioux Falls, SD (US)

(72) Inventors: Neil D. Anderson, Sioux Falls, SD (US); James M. Geraets, Sioux Falls, SD (US); William Higgins, Sioux Falls, SD (US); Spencer Douglas Lyman, Port Arthur, TX (US); Bill Miller, Sioux Falls, SD (US); Rodney Duane Pierson, Wentworth, SD (US); Danika Pollreisz, Sioux Falls, SD (US); Brock Weeldreyer, Sioux Falls, SD (US)

(73) Assignee: POET Research, Inc., Sioux Falls, SD (US)

( * ) Notice: Subject to any disclaimer, the term of this patent is extended or adjusted under 35 U.S.C. 154(b) by 0 days.

(21) Appl. No.: 17/078,792

(22) Filed: Oct. 23, 2020

Related U.S. Application Data

(60) Provisional application No. 62/924,991, filed on Oct. 23, 2019.

(51) Int. Cl.
*B01J 20/34* (2006.01)
*B01J 38/06* (2006.01)
*B01J 29/90* (2006.01)

(52) U.S. Cl.
CPC ....... *B01J 20/3408* (2013.01); *B01J 20/3491* (2013.01); *B01J 29/90* (2013.01); *B01J 38/06* (2013.01)

(58) Field of Classification Search
CPC ................... C01B 20/3408; C01B 20/3491
See application file for complete search history.

(56) References Cited

U.S. PATENT DOCUMENTS

| 7,767,178 | B2 * | 8/2010 | Hilaly | ..................... C07C 29/76 423/245.1 |
|---|---|---|---|---|
| 9,068,700 | B2 | 6/2015 | Sonnek et al. | |
| 9,415,342 | B2 | 8/2016 | Sonnek et al. | |
| 10,220,371 | B2 | 3/2019 | Zaiser et al. | |
| 10,603,626 | B2 * | 3/2020 | Wang | ....................... B01J 20/18 |
| 2007/0088182 | A1 * | 4/2007 | Hilaly | ..................... C07C 29/76 568/916 |
| 2015/0251128 | A1 | 9/2015 | Sonnek et al. | |

OTHER PUBLICATIONS

Dehydration, retreived from https://www.slideshare.net/carawebbmullen/distillation-dehydration-sieves5, on Sep. 11, 2019, (35 pages).
Katzen et al., "Ethanol distillation: the fundamentals", KATZEN International, Inc., Chapter 18, pp. 269-288, 1999 (20 pages).

\* cited by examiner

*Primary Examiner* — David M Brunsman
(74) *Attorney, Agent, or Firm* — Kagan Binder, PLLC

(57) ABSTRACT

The present disclosure relates to methods and systems for regenerating molecular sieves used in an alcohol dehydration process after the molecular sieves have become saturated with water.

21 Claims, 5 Drawing Sheets

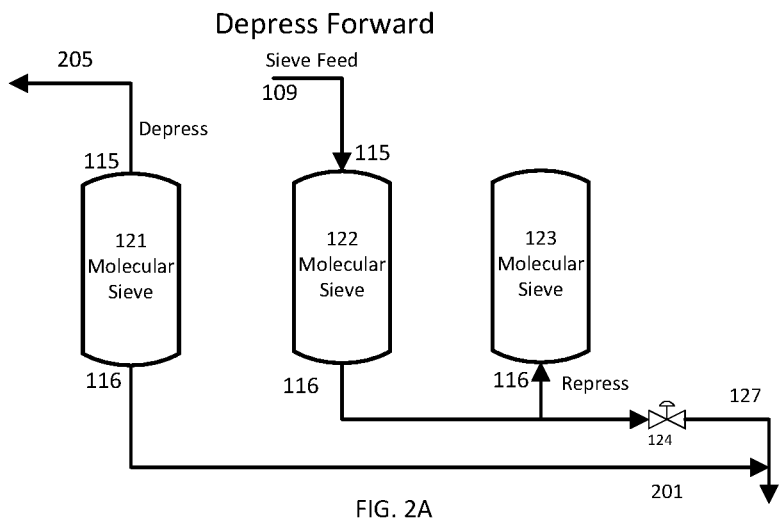
FIG. 2A
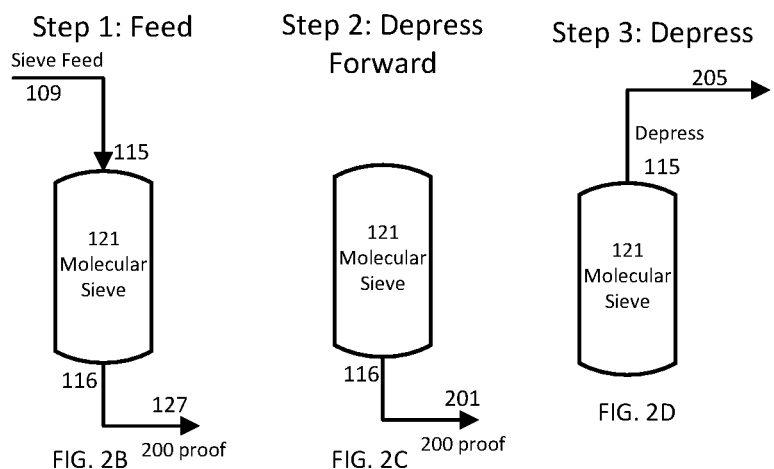
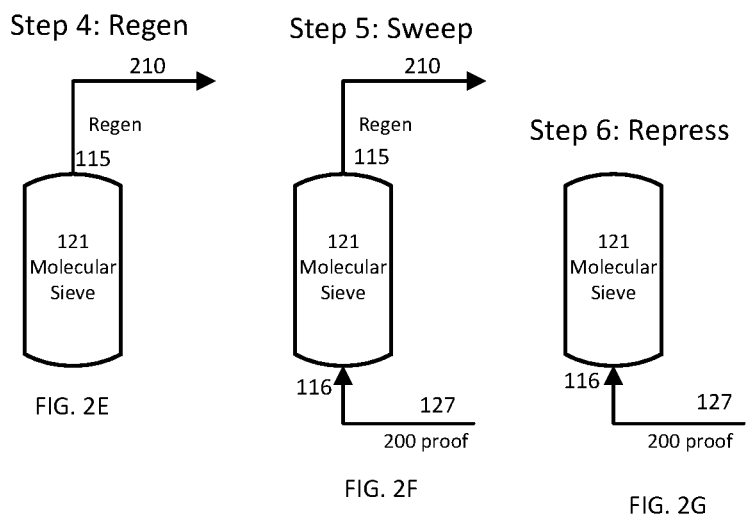

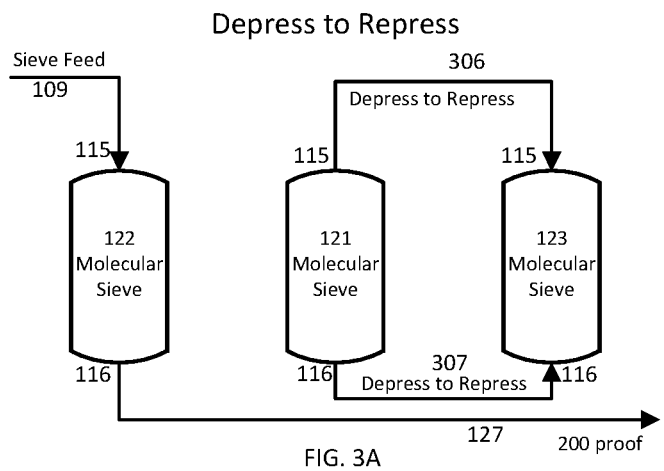
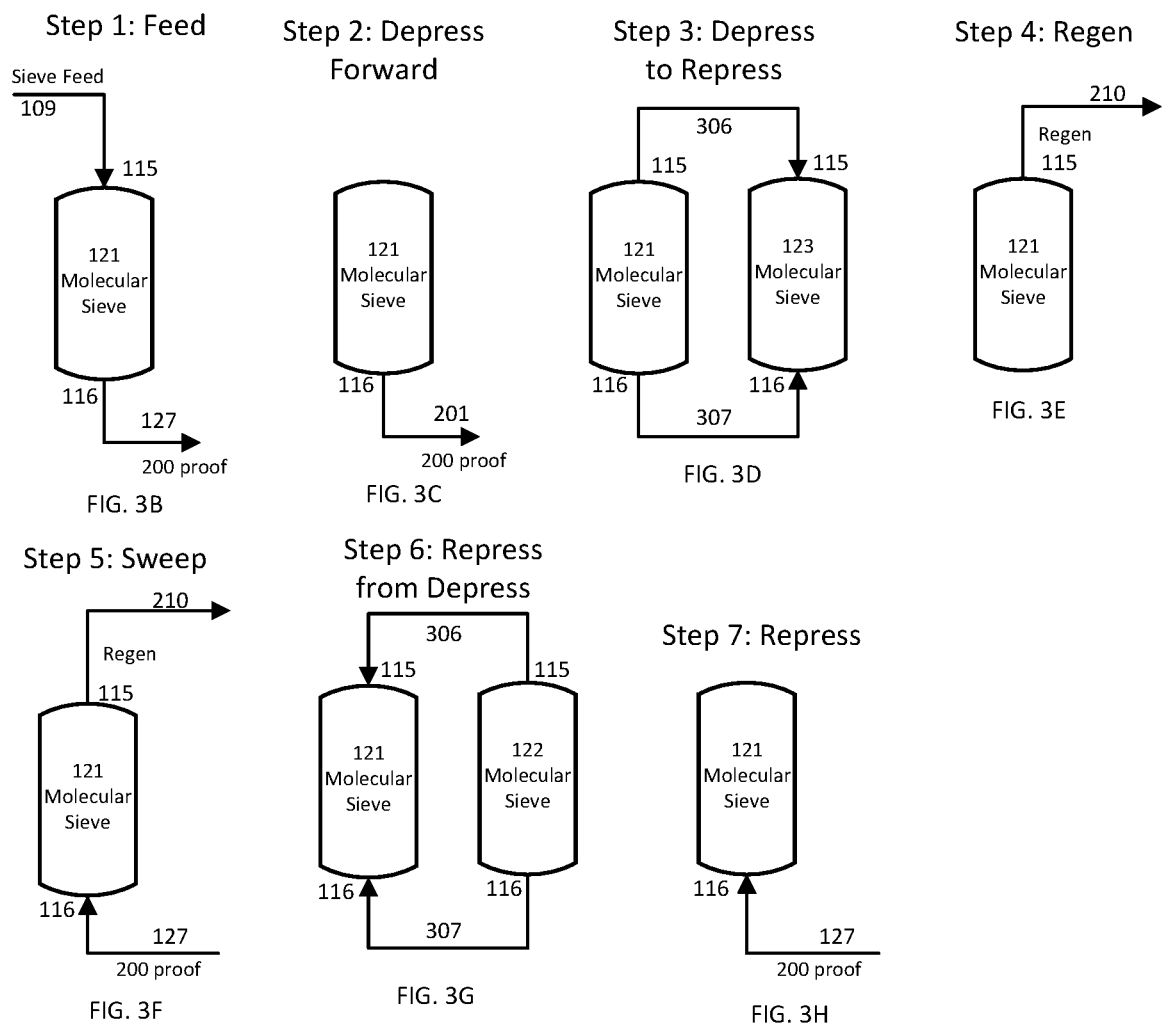

METHODS OF REGENERATING MOLECULAR SIEVES, AND RELATED SYSTEMS

RELATED APPLICATIONS

The present nonprovisional patent application claims the benefit of commonly owned provisional Application having Ser. No. 62/924,991, filed on Oct. 23, 2019, wherein the entirety of said provisional application is incorporated herein by reference.

BACKGROUND

Manufacture of alcohol such as ethanol, e.g., in a biorefinery, can include a distillation system that can refine a mixture of ethanol and water to concentrate the alcohol. In some embodiments, because an azeotrope of water and alcohol (e.g., ethanol) can form, the concentration of ethanol produced in a distillation column will be limited to about 192 proof. In some embodiments, the alcohol can be further concentrated by using a system of molecular sieves.

Dehydrating a mixture of ethanol and water using molecular sieves involves passing the mixture through a bed of molecular sieves contained in a vessel. Molecular sieves are solid particles (e.g., beads) that are porous and can be made of a wide variety of materials such as crystalline alumino-silicate (zeolite). The material characteristics (e.g., ionic characteristics) and porous structure can selectively retain molecules of one type relative to molecules of another type. For example, because the molecular size of ethanol is larger than water, the porous structure of molecular sieves can be selected to allow water molecules to be retained in the molecular sieves while allowing the ethanol to pass through the vessel, thereby concentrating the ethanol that exits the molecular sieve bed. There is a continuing need for regenerating molecular sieves used in an alcohol dehydration process after the molecular sieves (e.g., beads) have become saturated with water.

SUMMARY

The present disclosure includes embodiments of a method of regenerating molecular sieves used in an alcohol dehydration process, wherein the method includes:

a) providing a molecular sieve system includes two or more molecular sieve vessels, wherein each molecular sieve vessel includes a bed of molecular sieves, wherein each molecular sieve vessel includes an inlet and an outlet;

b) providing a gas feed stream including a gas mixture of alcohol and water to an inlet of a first molecular sieve vessel while discharging a gas product stream from an outlet of the first molecular sieve vessel, wherein gas mixture present in the first molecular sieve vessel during (b) is at a first pressure;

c) after (b), causing pressure of gas mixture that is present in the first molecular sieve vessel to reduce below the first pressure range to a second pressure while discharging a first gas depressurization stream from the inlet and/or outlet of the first molecular sieve vessel;

d) after (c), causing pressure of gas mixture that is present in the first molecular sieve vessel to reduce below the second pressure to a third pressure while discharging a second gas depressurization stream from the inlet of the first molecular sieve vessel; and e) after (d), causing pressure of gas mixture that is present in the first molecular sieve vessel to reduce below the third pressure to a fourth pressure while discharging a third gas depressurization stream from the inlet of the first molecular sieve vessel.

The present disclosure includes embodiments of a method of regenerating molecular sieves used in an alcohol dehydration process, wherein the method includes:

a) providing a molecular sieve system including at least first, second and third molecular sieve vessels, wherein each molecular sieve vessel includes a bed of molecular sieves, wherein each molecular sieve vessel includes an inlet and an outlet;

b) providing a gas feed stream including a gas mixture of alcohol and water to an inlet of the first molecular sieve vessel while discharging a gas product stream from the outlet of the first molecular sieve vessel, wherein gas mixture present in the first molecular sieve vessel during (b) is at a first pressure;

c) after (b), causing pressure of gas mixture that is present in the first molecular sieve vessel to reduce below the first pressure to a second pressure while discharging a first gas depressurization stream from the first molecular sieve vessel, wherein the first gas depressurization stream is discharged from the inlet or outlet of the first molecular sieve vessel;

d) after (c), causing pressure of gas mixture that is present in the first molecular sieve vessel to reduce below the second pressure to a third pressure while discharging a second gas depressurization stream from the inlet and/or outlet of the first molecular sieve vessel to an inlet and/or an outlet of the second molecular sieve vessel, wherein an interior of the second molecular sieve vessel is at a pressure below the second pressure when the first gas depressurization stream is initially introduced into the second molecular sieve vessel; and e) after (d), causing pressure of gas mixture that is present in the first molecular sieve vessel to reduce below the third pressure to a fourth pressure while discharging a third gas depressurization stream from the inlet of the first molecular sieve vessel.

The present disclosure also includes embodiments of a method of regenerating molecular sieves used in an alcohol dehydration process, wherein the method includes:

a) providing a molecular sieve system including two or more molecular sieve vessels, wherein each molecular sieve vessel includes a bed of molecular sieves, wherein each molecular sieve vessel includes an inlet and an outlet;

b) providing a gas feed stream including a gas mixture of alcohol and water to an inlet of a first molecular sieve vessel while discharging a gas product stream from an outlet of the first molecular sieve vessel and into a first header pipe, wherein gas mixture present in the first molecular sieve vessel during (b) is at a first pressure; and c) after (b), causing pressure of gas mixture that is present in the first molecular sieve vessel to reduce below the first pressure range to a second pressure while discharging a first gas depressurization stream from the inlet and/or outlet of the first molecular sieve vessel into a second header pipe, wherein the gas product stream from the first header pipe and the first gas depressurization stream from the second header pipe are blended together to form a blended gas stream.

The present disclosure also includes embodiments of a method of regenerating molecular sieves used in an alcohol dehydration process, wherein the method includes:

a) providing a molecular sieve system including two or more molecular sieve vessels, wherein each molecular sieve vessel includes a bed of molecular sieves, wherein each molecular sieve vessel includes an inlet and an outlet;

b) providing a gas feed stream including a gas mixture of alcohol and water to an inlet of a first molecular sieve vessel while discharging a gas product stream from an outlet of the first molecular sieve vessel, wherein gas mixture present in the first molecular sieve vessel during (b) is at a first pressure;

c) after (b), causing pressure of gas mixture that is present in the first molecular sieve vessel to reduce below the first pressure range to a second pressure while discharging a first gas depressurization stream from the inlet and/or outlet of the first molecular sieve vessel;

d) after (c), causing pressure of gas mixture that is present in the first molecular sieve vessel to reduce below the second pressure to a third pressure while discharging a second gas depressurization stream from the inlet of the first molecular sieve vessel to a pressure in the range from −14.7 to −5 psig.

BRIEF DESCRIPTION OF THE DRAWINGS

FIGS. 2A-2G are schematic diagrams illustrating an embodiment of regenerating molecular sieves according to the present disclosure;

FIGS. 3A-3H are schematic diagrams illustrating an embodiment of regenerating molecular sieves according to the present disclosure;

DETAILED DESCRIPTION

For illustration purposes, the embodiments described herein are in the context of concentrating ethanol produced in a biorefinery via fermentation of sugar derived from an ethanol plant.

Figure 1:
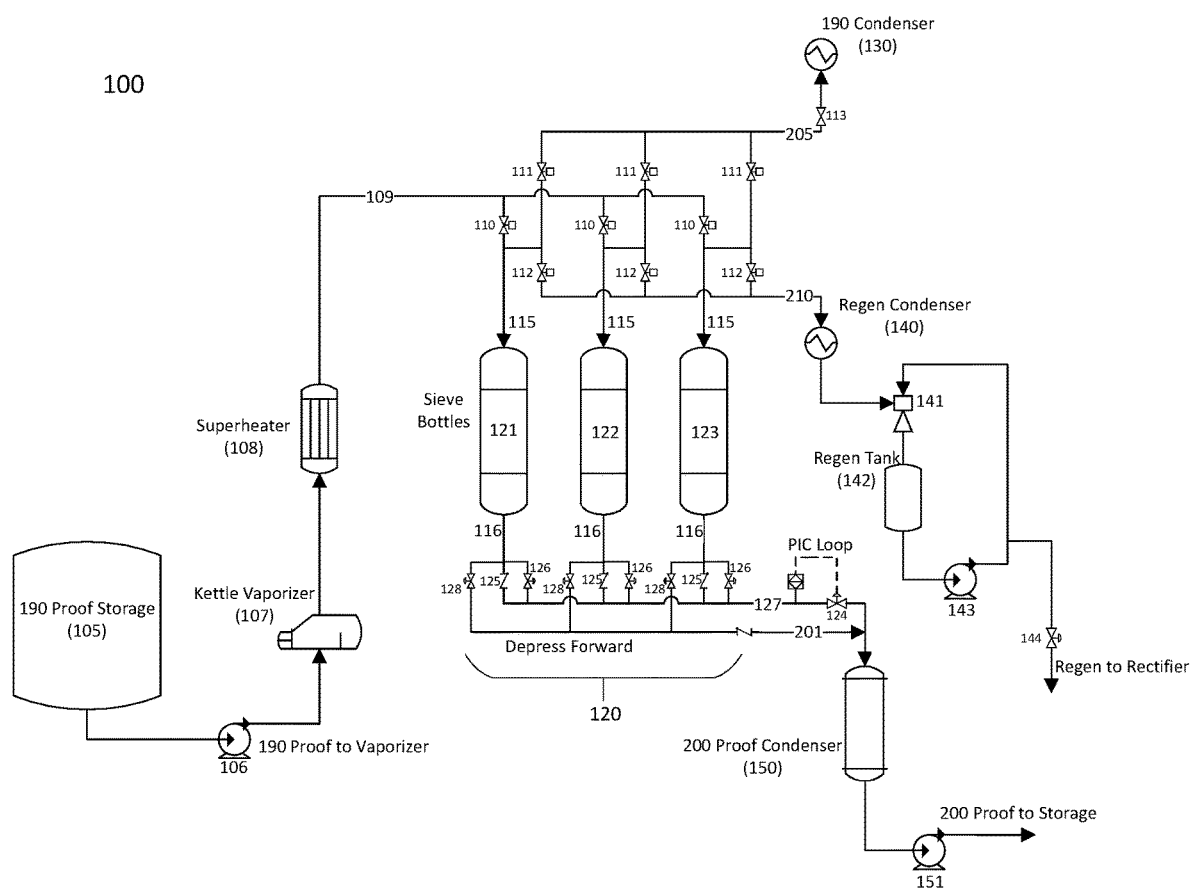
FIG. 1 is a schematic diagram illustrating an embodiment of a system for dehydrating a mixture of ethanol and water and regenerating molecular sieves according to the present disclosure.

A nonlimiting example of a system 100 for dehydrating a mixture of ethanol and water is illustrated in FIG. 1. One embodiment of regenerating molecular sieves according to the present disclosure will be described with reference to FIGS. 2A-2G. The same reference characters among FIGS. 1 and 2A-2G represent the same features described herein.

As shown in FIG. 1, system 100 includes a storage tank 105 that can be in fluid communication with a distillation column (not shown) to receive overhead product from the distillation column that has been condensed from gas to liquid. In some embodiments, the overhead product from distillation can have a concentration of ethanol in the range from 170 to 192 proof, from 180 to 191 proof, or even from 185 to 190 proof. "Proof" is the measure of the content of alcohol (e.g., ethanol) in a fluid (e.g., gas or liquid) and is calculated by multiplying the "alcohol by volume" (abv) by two, where "abv" is determined as milliliters of ethanol present in 100 milliliters of solution (e.g., ethanol and water). Because molecular sieve beds can operate to remove water more efficiently from a mixture of ethanol and water if the mixture is in a superheated gas state, liquid stored in 105 can be pumped via pump 106 to a heating system that can form a gas mixture of ethanol and water having a temperature in the range from 230 to 350° F. (e.g., from 230 to 275° F., or even from 250 to 320° F.) and depends on the pressure of the gas mixture. In some embodiments, the gas mixture can be at a pressure in the range from 25 to 75 psig, from 30 to 70 psig, or even from 40 to 60 psig. For illustration purposes, as shown in FIG. 1, the liquid mixture can be heated using a kettle vaporizer 107 and a superheater 108. A wide variety of other heating systems can be used if desired.

The gas feed stream 109 including a gas mixture of alcohol and water is transferred to molecular sieve system 120. A molecular sieve system can include one or more (e.g. two or more, three or more, four or more, etc.) molecular sieve vessels (bottles), where each molecular sieve vessel includes a bed of molecular sieves. Mesh screens (not shown) can be positioned at each end (top and bottom) of the vessel to support and contain the molecular sieves (e.g., beads). As shown in FIG. 1, molecular sieve system 120 includes three molecular sieve vessels 121, 122, and 123. Each molecular sieve vessel 121, 122, and 123 includes an inlet 115 and an outlet 116. The orientation of the sieves 121, 122, and 123 could be changed but the inlet 115 and outlet 116 are desirably located in a manner (e.g., at opposite ends) so that the gas feed stream has a sufficient residence time within a molecular sieve vessel to contact the molecular sieves and form a dehydrated product stream that exits the molecular sieve vessel.

For example, as shown in FIGS. 1, 2A and 2B, to dehydrate the gas feed stream 109, valves 111, 112, 126 and 128 associated with the molecular sieve vessel 121 are closed and valve 110 associated with the molecular sieve vessel 121 is open to allow the gas feed stream 109 including a gas mixture of alcohol and water (e.g., at 190 proof) to continuously flow into an inlet 115 of a molecular sieve vessel such as vessel 121 while continuously discharging a gas product stream 127 from an outlet 116 of the molecular sieve vessel 121. As the mixture passes through the molecular sieve vessel 121 water transfers from the gas mixture to the bed of molecular sieves and forms a gas product stream 127 that is more concentrated in ethanol (e.g., from 195 to 200 proof, 196 to 200 proof, or even from 198 to 200 proof) as compared to the gas feed stream 109. The gas mixture present in the molecular sieve vessel 121, while gas feed stream 109 is flowing into molecular sieve vessel 121 in the dehydration mode, is at a pressure in the range from 25 to 75 psig, from 40 to 60 psig, or even from 50 to 60 psig. As shown in FIG. 1, valve 110 can be a manual valve. Alternatively, as discussed further with respect to FIG. 6 below, valve 110 can be flow control valve that can be controllably adjusted to a desired position corresponding to a desired flow rate.

It is noted that, as shown in FIGS. 2A and 3A (FIG. 3A is discussed below), molecular sieve vessels 122 and 123 can be at various stages of dehydrating mode or regenerating mode as described herein throughout for molecular sieve vessel 121. In some embodiments, the mode of each of the molecular sieve vessels 121, 122, and 123 is staggered relative to each other so that molecular sieve system 120 can dehydrate ethanol via stream 109 on a continuous basis. The position of the various valves for each molecular sieve vessel while molecular sieve system 120 operates on a continuous basis is understood by reference to the description and figures of the present application.

The gas product stream 127 that is discharged from the outlet 116 of molecular sieve vessel 121 passes through check valve 125 and into a common header pipe that is in fluid communication with the outlets 116 of vessels 122 and 123. As shown, the gas product stream 127 flows through control valve 124 so that the pressure of gas product stream 127 reduces from the pressure present in the molecular sieve vessel 121 to a pressure present in condenser 150. The low pressure in condenser can vary over a wide range and can depend on the pressure in the vessel 121. In some embodiments, the pressure in condenser 150 can be from 0 to 50 psig, from 15 to 40 psig, from 15 to less than 30 psig, or even from 15 to 25 psig.

At some point during the dehydration process, the molecular sieves (e.g., beads) will become saturated with water and instead of removing water, the water will stay in the feed mixture with ethanol and the gas product stream will start to increase in water content. Eventually, the gas product stream may contain too much water and become out of specification, which can vary for a given ethanol plant (e.g., at about 198 proof or less). When this happens, the gas feed stream 109 can be directed to another molecular sieve vessel (e.g., vessel 122 or 123) using one or more valves so that the gas feed stream 109 can continue to be dehydrated, especially on a continuous basis. For example, while valves 111, 112, 126 for vessel 121 remain closed, valve 110 to vessel 121 is closed and valve 110 to vessel 122 or vessel 123 is opened to permit gas feed stream 109 to flow through the chosen molecular sieve vessel and become dehydrated.

By directing the gas feed stream 109 to another molecular sieve vessel such as vessels 122 or 123, the molecular sieves in vessel 121 can be regenerated by removing the water in the sieves so that the molecular sieves in vessel 121 can be used again to dehydrate gas feed stream 109 after molecular sieves in another molecular sieve vessel become saturated.

Regenerating the sieves in vessel 121 involves an initial depressurizing of vessel 121 since it is at a relatively high pressure (e.g., from 25 to 75 psig) for dehydration purposes, followed by further depressurizing to help extract water from the saturated molecular sieves in vessel 121 by exposing the saturated molecular sieves to a vacuum to draw the water out. Exposing the molecular sieves to a vacuum can draw the majority of water out of the molecular sieves and is, therefore, sometimes referred as "regenerating" or "regen".

There is a continuing need and desire to improve the energy management during the depressurization processes involved in regenerating molecular sieves, especially with existing systems so as to avoid undue capital investment.

The present disclosure involves processes for regenerating molecular sieves in a manner that appreciates the physical state (liquid or vapor) and/or composition of fluid streams involved in the various phases of the overall regeneration of molecular sieves and directs the streams to a destination in the overall ethanol manufacture process that is compatible with the composition of a given stream while at the same time helping manage energy in an efficient manner.

Regenerating molecular sieves in one or more molecular sieve vessels can begin at any desired time. Nonlimiting examples of determining when to regenerate molecular sieves include selecting a predetermined time (e.g., setting a timer that corresponds to when sieves typically become saturated), determining (by measuring) when the average proof of the gas product stream for a given period time becomes less than 198 proof and combinations thereof.

The initial process involved in regenerating the molecular sieves in vessel 121 involves depressurizing vessel 121 and regenerating can occur in one or more stages.

Figure 5:
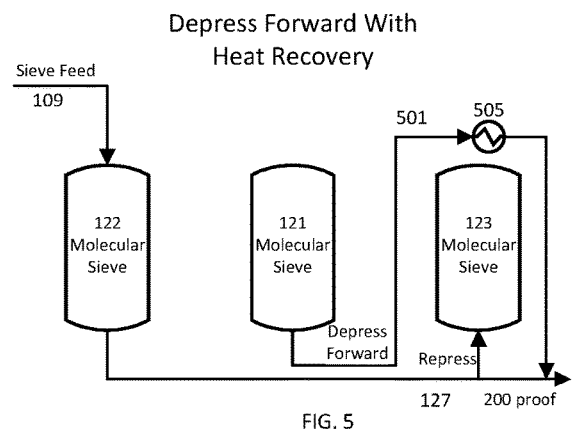
FIG. 5 is a schematic diagram illustrating how an optional heat exchanger could be included in a system for regenerating molecular sieves according to the present disclosure.

Referring to FIG. 1 and the schematic in FIGS. 2A and 2C, a first depressurization stage occurs while discharging a gas depressurization stream 201 from the outlet 116 of vessel 121 (also referred to as "depress forward" stage). As used herein, a "gas depressurization stream" refers to a gas stream that is or has been discharged from a molecular sieve vessel from a relatively high pressure to a relatively low pressure. A gas depressurization stream according to the present disclosure can be in fluid communication with a wide variety of equipment that provide a reduced pressure so as to depressurize a molecular sieve vessel. Nonlimiting examples of equipment that provides a lower pressure for molecular sieve vessel to depressurize into via a depressurization stream include heat exchangers, blowers, and the like. For illustration purposes, depressurization streams described herein can be sent to heat exchanger systems so that thermal energy can be transferred and recovered for another use. For example, the gas depressurization stream 201 can be in fluid communication with a wide variety heat exchanger systems to recover at least a portion of energy due to cooling and condensing gas depressurization stream 201. As shown in FIG. 1, gas depressurization stream 201 is in fluid communication with condenser 150. Additionally or alternatively, gas depressurization stream 201 could be discharged from inlet 115 of vessel 121 and be in fluid communication with condenser 150. Additionally or alternatively, at least a portion of gas depressurization stream 201 can be transferred to one or more additional heat exchanger systems. For example, as alternatively shown in FIG. 5, the initial depressurization stream 501 from a vessel such as vessel 121 can be in fluid communication with a heat exchanger 505 in a biorefinery to condense stream 501 into a liquid, where the heat exchanger 505 is different from condenser 150. Nonlimiting examples of heat exchanger 505 include heat exchangers used to transfer heat to a beer stream, a stillage stream (e.g., whole stillage stream, a thin stillage stream, a concentrated thin stillage stream, a cooling tower stream, and the like.

Referring back to FIG. 1, n some embodiments, after gas feed stream 109 is shut off to molecular sieve vessel 121, the pressure of gas mixture that is present in the molecular sieve vessel 121 can be reduced below the pressure range used in dehydration mode to a "depress forward" mode pressure range. The "depress forward" mode pressure range can be any desired pressure range that permits vessel 121 to reduce in pressure in vessel 121. For example, the "depress forward" mode pressure range can be determined by where the gas mixture is depressurized to. In some embodiments, the "depress forward" mode pressure range can be from −14 to less than 50 psig, from 0 to less than 30 psig, from 10 to less than 30 psig, from 5 to 25 psig, or even from 10 to 25 psig. In some embodiments, the pressure difference from vessel 121 to where it is depressurizing to (e.g., condenser 150) can be relatively low such that given the size of piping and valve positions, related noise and/or pipe vibrations can advantageously be relatively low as compared to systems that depressurize with higher pressure differentials and/or smaller pipes.

In more detail with respect to the embodiment shown in FIGS. 1, 2A and 2C, the valves 110, 111, 112 and 126 associated with vessel 121 are closed and valve 128 associated with molecular sieve vessel 121 is open so that a gas depressurization stream 201 flows into a header and is in fluid communication with the lower pressure present in condenser 150. This depressurization of vessel 121 permits the interior of vessel 121 to reduce in pressure and, in some embodiments, equalize with the lower pressure in condenser 150 so that the pressure in vessel 121 is +/−10 psig, +/−5 psig, or even +/−1 psig of the pressure in condenser 150. In some embodiments, as shown in FIG. 1, gas depressurization stream 201 combines with (is blended with) product stream 127 coming from sieve vessel 123 at a point located on the low-pressure side of valve 124, followed by being condensed to a liquid in condenser 150. Alternatively, gas depressurization stream 201 could be condensed into a liquid first and then combined with the condensed ethanol liquid product being discharged from condenser 150.

As the gas flows out of vessel 121 through outlet 116 during depressurization it can become dehydrated by the molecular sieves in vessel 121 and can be blended with stream 127 to form product. By directing gas depressurization stream 201 through outlet 116 additional product can be formed directly instead of flowing gas depressurization stream 201 backwards out of inlet of 115 of vessel 121. If the gas flows instead back through inlet 115 it may have to be transferred back through a molecular sieve to be dehydrated and/or may consume additional energy if it is condensed and re-vaporized for reprocessing through a molecular sieve.

As mentioned above, energy from depressurization stream 201 can be captured in condenser 150. For example, condenser 150 can be used as a reboiler for a distillation column (not shown), where the energy of cooling and condensation of vapor to liquid can be transferred to heat up fluid to be distilled and/or create steam for distillation.

Advantageously, by appreciating the composition of depressurization stream 201, it can be combined with product stream 127 during at least a portion of molecular sieve regeneration (e.g., up until further blending would cause stream 127 to have too much water due to regenerating sieves in vessel 121 and cause the blended stream to be out of specification). In some embodiments, such a process can be incorporated into existing molecular sieve systems by directing the flow of the depressurization stream 201 where lower pressures can be accessed by blending the depressurization stream 201 with other fluids in a compatible manner so as to be energy efficient.

Depressurizing molecular sieve vessel 121 via stream 201 can be controlled in a variety of ways. For example, molecular sieve vessel 121 can be depressurized via stream 201 until a pre-determined pressure is achieved that corresponds to a composition of stream 201 that does not cause stream 127 to have too much water and be out of specification. For example, as mentioned, vessel 121 can be depressurized until the pressure in vessel 121 is measured to be in the range from −14 to less than 50 psig, from 0 to less than 30 psig, from 10 to less than 30 psig, from 5 to 25 psig, or even from 10 to 25 psig. In some embodiments, molecular sieve vessel 121 can be depressurized via stream 201 until the pressure in vessel 121 is equalized with a lower pressure in downstream equipment such a heat exchanger system (e.g., condenser 150 and/or condenser 505) so that the pressure in vessel 121 is +/−10 psig, +/−5 psig, or even +/−1 psig of the pressure in condenser said heat exchanger system.

As another example, molecular sieve vessel 121 can be depressurized via stream 201 for a pre-determined time that corresponds to a composition of stream 201 that does not cause stream 127 to have too much water and be out of specification. In some embodiments, valve 128 can be opened to permit depressurization stream 201 to flow for a time period from 5 seconds to 120 seconds, from 10 seconds to 60 seconds, or even from 10 to 30 seconds.

In some embodiments, as shown in FIGS. 1, 2A and 2D, after depressurization of molecular sieve vessel 121 through outlet 116 ("depress forward" stage) is complete, while the valves 110, 112 and 126 associated with molecular sieve vessel 121 remain closed, the valve 128 can be closed, and the valve 111 associated with vessel 121 can be opened so that gas mixture that is present in the molecular sieve vessel 121 can be in fluid communication with a lower pressure as part of a second depressurization stage (also referred to as "depress" stage), thereby causing a gas depressurization stream 205 to discharge from vessel 121 via inlet 115 and cause the pressure in vessel 121 to reduce below the pressure present during the first depressurization stage to a pressure in "depress" mode pressure range. The pressure reduction in the second stage permits vessel 121 to reduce in pressure and facilitate the overall process of regenerating molecular sieves located in vessel 121.

The "depress" mode pressure range can be any desired pressure range that permits vessel 121 to reduce in pressure and facilitate the overall process of regenerating molecular sieves located in vessel 121. For example, the "depress" mode pressure range can be determined by where the gas mixture is depressurized to, as will be illustrated herein below. In some embodiments, the resulting pressure in the "depress" mode pressure range can be from −14 to 20 psig, from −5 to 20 psig, from −5 to 10 psig, or even from −3 to 5 psig. While some of the pressure ranges described herein for the second depressurization stage may overlap with one or more pressure ranges in the first depressurization stage, it is understood that whichever pressure or pressure range is selected for the first depressurization stage the pressure that the second depressurization stage is performed at will be lower than the pressure at the first depressurization range.

The gas depressurization stream 205 can be in fluid communication with a wide variety of heat exchanger systems to capture the energy due to cooling and condensing gas depressurization stream 205. As shown in FIGS. 1 and 2D, gas depressurization stream 205 is in fluid communication with condenser 130, which is different from condenser 150. The gas mixture that is condensed in condenser 150 has a higher proof (e.g., about 200 proof) as compared to the gas mixture condensed in condenser 130 (e.g., about 190 proof). As shown in FIG. 1, condenser 130 can be the condenser for a rectifying column that forms an overhead, liquid product stream that is then transferred to storage 105. Optionally or alternatively, at least a portion of gas depressurization stream 205 can be transferred to one or more additional heat exchanger systems.

In more detail with respect to FIGS. 1, 2A and 2D, when valve 111 is open, gas depressurization stream 205 is in fluid communication with the lower pressure present in condenser 130 so that the interior of vessel 121 is exposed to the lower pressure in condenser 130 and, in some embodiments, equalizes to said pressure so that the pressure in vessel 121 is +/−10 psig, +/−5 psig, or even +/−1 psig of the pressure in condenser 130. It is noted that as shown in FIG. 1, valve 113 is a manual valve used to adjust flow rate. Alternatively, valve 113 could be a pressure control valve or a flow control valve, which may help reduce noise and/or vibrations associated with relatively high pressure flow rates through piping.

With respect to the system 100 shown in FIG. 1, by extracting gas mixture from molecular sieve vessel 121 through inlet 115 via gas depressurization stream 205, pressures lower than those present in condenser 150 can be accessed in condenser 130, which facilitates depressurization of vessel 121. Further, by re-directing depressurization instead of continuing to discharge gas out of outlet 116 of vessel 121, undue dilution of product stream 127 with too much water can be avoided.

As shown in FIG. 1, depressurization stream 205 can be condensed into a liquid via condenser 130. In some embodiments, condenser 130 condenses depressurization stream 205 using cooling tower water instead of recovering energy like in condenser 150 (described above). After condensing depressurization stream 205 into a liquid, it can be transferred to one or more locations that are selected based on its composition. In some embodiments the condensed liquid is in fluid communication with an overhead, liquid product stream from a rectifying column. For example, it can be transferred to overhead product storage 105 shown in FIG. 1. In some embodiments, the depressurization stream 205 can be from 165 to 192 proof ethanol.

Advantageously, by appreciating the composition of depressurization stream 205, it can be recovered as a stream that is separate from the initial depressurization stream 201 during the depressurization process. In some embodiments, such a process can be incorporated into existing molecular sieve systems by directing the flow of the depressurization stream 205 where lower pressures can be accessed by blending the depressurization stream 205 with other fluids in a compatible manner.

Depressurizing molecular sieve vessel 121 via stream 205 can be controlled in a variety of ways. For example, molecular sieve vessel 121 can be depressurized via stream 205 until a pre-determined pressure is achieved that corresponds to a composition of stream 205 that does not have too much water (due to extraction from the sieves) with respect to where stream 205 is being directed to (e.g., re-pressurizing another molecular sieve bottle (e.g., discussed in FIG. 3D below), added to 190 proof ethanol storage 105, and the like). For example, as mentioned, vessel 121 can be depressurized until the pressure in vessel 121 is measured to be in the range from −14 to 20 psig, from −5 to 20 psig, from −5 to 10 psig, or even from −3 to 5 psig. In some embodiments, molecular sieve vessel 121 can be depressurized via stream 205 until the pressure in vessel 121 is equalized with a lower pressure in downstream equipment such a heat exchanger system (e.g., condenser 130).

As another example, molecular sieve vessel 121 can be depressurized via stream 205 for a pre-determined time that corresponds to a composition of stream 205 that does not have too much water (due to extraction from the sieves) with respect to where stream 205 is being directed to (e.g., added to 190 proof ethanol storage 105). In some embodiments, valve 111 can be opened to permit depressurization stream 205 to flow for a time period from 5 seconds to 300 seconds, from 10 seconds to 100 seconds, or even from 20 to 60 seconds.

In some embodiments, as shown in FIGS. 1, 2A and 2E, after the second stage of depressurization of molecular sieve vessel 121 through inlet 115 is complete, while the valves 110, 126, and 128 associated with molecular sieve vessel 121 remain closed, the valve 111 can be closed, and the valve 112 associated with vessel 121 can be opened so that gas mixture that is present in the molecular sieve vessel 121 can be in fluid communication with a lower pressure during a third and final depressurization stage (also referred to as a regeneration or "regen" stage), thereby causing gas to discharge from vessel 121 via inlet 115 and cause the pressure in vessel 121 to reduce below the pressure present during the second depressurization stage. The reduced pressure caused by the third depressurization stage can be any desired pressure range that permits vessel 121 to reduce in pressure and facilitate extracting water from molecular sieves located in vessel 121. In some embodiments, the reduced pressure caused by the third depressurization stage can be a vacuum from −14.7 to below 0 psig, from −13 to −8 psig, or even from −12 to −5 psig.

The final depressurization stage described in FIG. 2E occurs while discharging a gas depressurization stream 210 from the inlet 115 of vessel 121. The gas depressurization stream 210 can be in fluid communication with a wide variety of heat exchanger systems to cool and condense gas depressurization stream 210. As shown in FIG. 1, gas depressurization stream 210 is in fluid communication with condenser 140, which is different from condensers 130 and 150. In some embodiments, condenser 140 can use cooling tower water to cool and condense gas stream 210. Optionally or alternatively, at least a portion of gas depressurization stream 210 can be transferred to one or more additional heat exchanger systems.

In more detail with respect to FIGS. 1, 2A and 2E, when valve 112 is open, gas depressurization stream 210 is in fluid communication with the lower pressure present in condenser 140 so that the interior of vessel 121 equalizes to said pressure. As shown in FIG. 1, the condensed liquid from condenser 140 is drawn therefrom using a vacuum system that includes a vacuum eductor 141, tank 142, pump 143 and valve 144. A portion of the condensed liquid from condenser 140 is recirculated through vacuum eductor 141 to generate a vacuum. Tank 142 includes a vent to a vacuum pump (not shown). The level of liquid in tank 142 can be controlled using valve 144 to remove a portion of liquid as needed. As noted below, the removed liquid can be transferred to a distillation column (not shown) because it has a relatively higher amount of water as compared to the overhead product stream from distillation (e.g., about 120 proof or less ethanol).

By directing gas depressurization stream 210 through inlet 115 pressures lower than those present in condenser 130 can be accessed in condenser 140, which facilitates regeneration of molecular sieves in vessel 121. Further, instead of continuing to discharge stream 205 toward storage 105, undue dilution of overhead product in storage 105 with too much water can be avoided.

As shown in FIG. 1, depressurization stream 210 can be condensed into a liquid via condenser 140. After condensing depressurization stream 210 into a liquid, it can be transferred to one or more locations through control valve 144 that are selected based on its composition. In some embodiments, since the majority of water removed from the molecular sieves can be present in stream 210, stream 210 can be transferred to a stripping section of a distillation column (not shown). In some embodiments, the depressurization stream 210 can be from 30 to 120 proof ethanol.

Advantageously, by appreciating the composition of depressurization stream 210, it can be separately recovered from the depressurization streams 201 and/or 205 during depressurization. In some embodiments, such a process can be incorporated into existing molecular sieve systems by directing the flow of the depressurization stream 210 where lower pressures can be accessed.

When depressurization and regeneration is complete, a molecular sieve vessel can be prepared to be brought back online into dehydration mode, which in some embodiments can involve pressurizing vessel 121 from about −12 psig to about 50 psig.

In some embodiments, referring to FIGS. 1 and 2F, valves 110, 111 and 128 associated with the molecular sieve vessel 121 are closed and valves 112 and 126 associated with the molecular sieve vessel 121 are open to allow at least a portion of high pressure product stream 127 (e.g., 200 proof ethanol) generated from another molecular sieve to flow from the common header shared among vessels 121, 122, and 123 and into vessel 121 through outlet 116 and help push ("sweep") at least a portion of any remaining water out of vessel 121 and to the regen condenser 140. As illustrated in FIG. 2F, during the sweep stage, molecular sieve vessel 121 remains at about the same vacuum that is present from the prior "regen" stage because the main purpose of sweeping is to flush out remaining water, but the pressure may increase 1-2 psi relative to the pressure during the "regen" stage. Valve 126 can be adjusted (e.g., to an at least partially open position) to provide the desired flowrate. For example, valve 126 can be a flow control valve that can be adjusted so that the flow of high pressure product stream 127 does not physically disrupt the molecular sieves (which are in a vacuum environment immediately after regeneration) in a manner that damages or otherwise degrades molecular sieves to an undue degree. If desired, valve 126 can be coupled to a flow meter to help adjust valve 126 to a desired position and flowrate.

After the "sweep" is complete, vessel 121 can be re-pressurized to the pressure of gas feed stream 109 for dehydrating mode. In some embodiments, referring to FIGS. 1 and 2G, valves 110, 111, 112 and 128 associated with the molecular sieve vessel 121 are closed and valve 126 associated with the molecular sieve vessel 121 can be opened (e.g., fully opened or partially opened) to allow at least a portion high pressure product stream 127 (e.g., 200 proof ethanol) generated from another molecular sieve to flow from the common header shared among vessels 121, 122, and 123 and into vessel 121 through outlet 116 and pressurize vessel 121 to the pressure of gas feed stream 109.

Another embodiment according to the present disclosure is illustrated in connection with FIGS. 3A-3H. The process illustrated in FIGS. 3A-3H is similar to the embodiment described in FIGS. 2A-2G, but the embodiment described in FIGS. 3A-3H can avoid having to send the gas stream in the second depressurization stage to a condenser (e.g., condenser 130), thereby keeping the energy in the second depressurization stream within the molecular sieve system instead of using cooling tower water to condense gas stream 205 discussed above with respect to FIG. 2D. The same reference characters among FIGS. 1 and 2A-2G represent the same features described herein. Advantageously, by avoiding using the condenser for the rectifier column as condenser 130 and depressurizing to a molecular sieve instead, the rectifier overhead pressure can be relatively more stable and/or noise levels in distillation can be reduced. As yet another advantage, the sieve efficiency of a molecular sieve vessel can be improved by avoiding using the condenser for the rectifier column as condenser 130 and depressurizing to a molecular sieve instead. While not being bound by theory, it is believed that avoiding a condenser 130 can reduce the amount of material that needs to be re-vaporized, which translates into being more efficient and save on energy costs (e.g., natural gas costs).

FIGS. 3B and 3C are similar to FIGS. 2B and 2C, respectively, and their description is not repeated here.

In some embodiments, after depressurization of molecular sieve vessel 121 through outlet 116 in connection with FIG. 3C is complete, a second stage of depressurization according to the present disclosure can proceed according to FIG. 3D (also referred to as "depress to repress"). As shown in FIGS. 1, 3A and 3D while the valves 110, 112, 113 and 126 associated with molecular sieve vessels 121 and 123 are closed, valves 128 and/or valves 111 associated with vessels 121 and 123 can be opened, thereby causing pressure of gas mixture that is present in the molecular sieve vessel 121 to reduce below the pressure in the first depressurization stage ("depress forward" stage). If valves 111 are opened, a second gas depressurization stream 306 is discharged from the inlet 115 of molecular sieve vessel 121 to the inlet 115 of molecular sieve vessel 123. If valves 128 are opened, a second gas depressurization stream 307 is discharged from the outlet 116 of molecular sieve vessel 121 to the outlet 116 of molecular sieve vessel 123. It is appreciated that an inlet from one vessel could discharge instead to an outlet of another vessel, and vice versa, but inlets and outlets of multiple molecular sieve vessels can be in fluid communication with a common header, respectively, therefore making discharging from an inlet to an inlet and from an outlet to an outlet relatively more desirable.

In some embodiments, the molecular sieve vessel 123 has just completed the "regen" step or the "sweep" step described in FIGS. 2E and 2F above so the interior of molecular sieve vessel 123 is at a relatively low pressure (e.g., from −7 to −14 psig, or even from −9 to −12 psig), which is below the pressure in molecular sieve vessel 121 when the second gas depressurization streams 306 and/or 307 are initially introduced into the molecular sieve vessel 123. Accordingly, when the interiors of vessels 121 and 123 are exposed to each other and in fluid communication they can equalize to a pressure that is in between each of their pressures prior to exposure. For example, molecular sieve vessel 121 may be at a pressure from 15 to 35 psig prior to being exposed to the interior of vessel 123, so the interiors of each of vessels 121 and 123 may equalize to a pressure in the range from −5 to 15 psig, from 0 to 10 psig, or even from 0 to 5 psig. The composition of the second gas depressurization streams 306 and 307 can be the same or similar to gas feed stream 109 making the second gas depressurization streams 306 and 307 compositionally suitable for pressurizing molecular sieve vessel 123 so that vessel 123 can be brought back online for dehydrating mode. Advantageously, by depressurizing vessel 121 and pressurizing vessel 123 in this manner, energy can be transferred within the molecular sieve system so as to reduce the energy input for regenerating molecular sieves.

Figure 4:
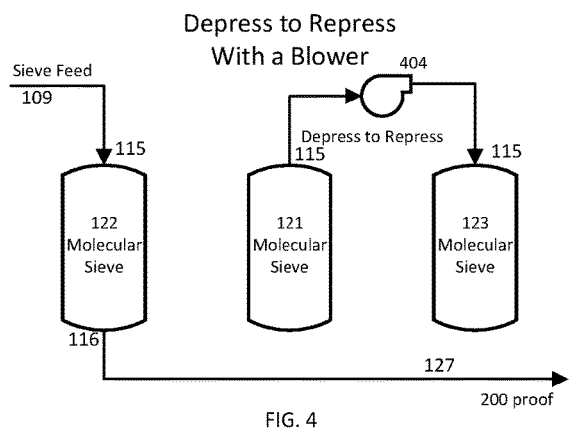
FIG. 4 is a schematic diagram illustrating how an optional powered fluid transfer device could be used in regenerating molecular sieves according to the present disclosure.

Alternatively or optionally, molecular sieve vessel 123 could be re-pressurized to a higher pressure using a pressure assisting device instead of relying on only the vessels 121 and 123 to equalize in pressures as described above. For example, a powered fluid transfer device such as a blower or compressor 404 as shown in FIG. 4 could be used to assist in pressurizing the gas contents from vessel 121 into vessel 123.

Depressurizing molecular sieve vessel 121 as described in FIG. 3D can be performed while molecular sieve vessel 122, as shown in FIG. 3A, is dehydrating gas feed stream 109 such the molecular sieve system can operate in a continuous mode to dehydrate gas feed stream 109. Accordingly, valve 110 associated with vessel 122 is open while valves 111, 112, and 126 associated with vessel 122 are closed so that gas feed stream 109 can flow through vessel 122 and be dehydrated to produce gas product stream 127 while vessels 121 and 123 are in modes described above with respect to FIG. 3D.

After depressurizing molecular sieve vessel 121 as described with respect to FIG. 3D, vessel 121 can be further depressurized as shown in FIG. 3E, which is the same process as described above with respect to FIG. 2E so it is not repeated here. After depressurizing molecular sieve vessel 121 as shown in FIG. 2E, a "sweep" of molecular sieve vessel 121 can be performed as shown in FIG. 3F, which is the same process as described above with respect to FIG. 2F so it is not repeated here.

After performing a "sweep" on molecular sieve vessel 121 as shown in FIG. 3F, molecular sieve vessel 121 can be re-pressurized to the pressure of gas feed stream 109 for dehydrating mode. In some embodiments, referring to FIGS. 1, 3G and 3H, molecular sieve vessel 121 can be at least initially pressurized by a molecular sieve vessel being depressurized for regeneration purposes in a manner similar to that described above in FIG. 3D with respect to depressurizing molecular sieve vessel 121 while at the same time at least partially re-pressurizing vessel 123. Here, molecular sieve vessel 123 may now be online in dehydration mode while molecular sieve vessel 122 is depressurizing so that it may be regenerated. Accordingly, while the valves 110, 112, 113 and 126 associated with molecular sieve vessels 121 and 122 are closed, valves 128 and/or valves 111 associated with vessels 121 and 122 can be opened, thereby causing pressure of gas mixture that is present in the molecular sieve vessel 122 to pressurize molecular sieve vessel 121 at least partially toward the pressure of gas feed stream 109 by discharging a second gas depressurization stream 306 from the inlet 115 of molecular sieve vessel 122 to the inlet 115 of molecular sieve vessel 121 and/or by discharging a second gas depressurization stream 307 from the outlet 116 of molecular sieve vessel 122 to the outlet 116 of molecular sieve vessel 121.

In some embodiments, the molecular sieve vessel 122 has just completed the first depressurization step described in FIG. 3C above so the interior of molecular sieve vessel 122 may be at a relatively higher pressure (e.g., from 15 to 35 psig, or even from 15 to 20 psig) relative to molecular sieve vessel 121 when the second gas depressurization streams 306 and/or 307 are initially introduced into the molecular sieve vessel 121 from molecular sieve vessel 122. Accordingly, when the interiors of vessels 121 and 122 are exposed to each other they can equalize to a pressure in between each of their pressures prior to exposure. For example, molecular sieve vessel 121 may be at a pressure from −7 to −14 psig, or even from −9 to −12 psig, prior to being exposed to the interior of vessel 122, so the interiors or each of vessels 121 and 122 may equalize to a pressure in the range from 0 to 10 psig, or even from 0 to 5 psig. The composition of the second gas depressurization streams 306 and 307 can be the same or similar to gas feed stream 109 making the second gas depressurization streams 306 and 307 compositionally suitable for pressurizing molecular sieve vessel 121 so that vessel 121 can be brought back online for dehydrating mode. Advantageously, by depressurizing vessel 122 and pressurizing vessel 121 in this manner, energy can be transferred within the molecular sieve system so as to reduce the energy input for regenerating molecular sieves.

In some embodiments, e.g., as described with respect to FIG. 3G above, the molecular sieve vessel 121 is still at a pressure below that of gas feed stream 109 so it can be further pressurized before switching to dehydrating mode. As shown in FIGS. 1 and 3H, molecular sieve vessel 121 can be further pressurized to the pressure of gas feed stream 109 (e.g., 45 to 50 psig) by closing valves 111 and 128, and opening valve 126 so that at least a portion of gas product stream 127 produced from molecular sieve vessel 123 can pressurize molecular sieve vessel 121 to the pressure of gas feed stream 109.

Alternatively or optionally, as similarly described above with respect to FIGS. 3D and 4, molecular sieve vessel 121 could be re-pressurized to a higher pressure (e.g., the pressure of gas feed stream 109) using a pressure assisting device instead of relying on only the vessels 121 and 122 to equalize in pressures as described above. For example, a blower or compressor similar to 404 could be used to assist in pressurizing the gas contents from vessel 122 into vessel 121.

When pressurizing molecular sieve vessel 121 is complete, valve 126 can be closed and valve 110 can be opened so that gas feed stream 109 flows through molecular sieve vessel 121 to dehydrate the mixture of ethanol and water and form a gas product stream 127.

Figure 6:
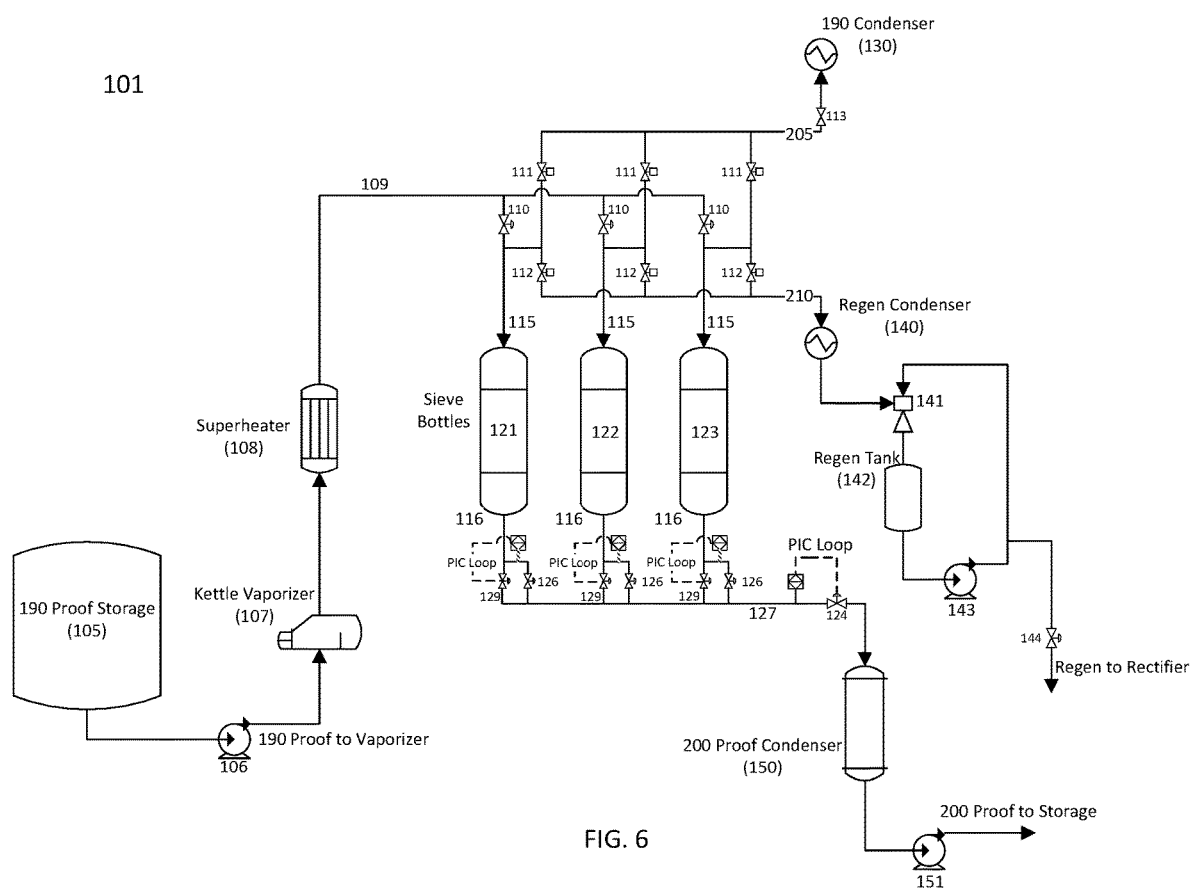
FIG. 6 is a schematic diagram illustrating another embodiment of a system for dehydrating a mixture of ethanol and water and regenerating molecular sieves according to the present disclosure.

Another nonlimiting example of a system for dehydrating a mixture of ethanol and water is illustrated in FIG. 6 as system 101. The same reference characters among FIGS. 1 and 6 represent the same features described herein above and their description is not repeated here. Also, system 101 can be used to perform the processes described herein above with respect to each of FIGS. 2A-2G and FIGS. 3A-3H.

The system 101 illustrated in FIG. 6 is similar to system 100 described in FIG. 1, but the embodiment described in FIG. 6 specifically illustrates valve 110 as a flow control valve that can be controllably adjusted to a desired position corresponding to a desired flow rate. If desired, flow control valve 110 can be coupled to a control loop (e.g., with a flow meter) to control the position of valve 110. Similar to the operation of valve 126 described above with respect to each of FIGS. 2G and 3H, the valve 110 in FIG. 6 that is associated with the molecular sieve vessel 121 can be opened (e.g., fully opened or partially opened) to allow at least a portion of gas feed stream 109 into vessel 121 through inlet 115 and pressurize vessel 121 to the pressure of gas feed stream 109. The flow rate of gas stream 109 can be adjusted via valve 110 so that the molecular sieves in vessel 121 are not disrupted to an undue degree. Accordingly, the time to repressurize vessel 121 can depend on the flowrate of gas stream 109 into vessel 121.

As shown in FIG. 6, valve 110 and/or valve 126 can be used to repressurize any associated molecular sieve vessel using at least a portion of the feed stream 109 and at least a portion of the product stream 127, respectively.

The system 101 illustrated in FIG. 6 is different from system 100 described in FIG. 1 in that system 101 does not include any valves 128 and the associated separate header for the "depress forward" described with respect to each of FIGS. 2C and 3C. Instead each check valve 125 in system 100 is replaced with a pressure control valve 129. For example, when the gas product stream 127 is discharged from the outlet 116 of molecular sieve vessel 121 it flows through control valve 129 so that the pressure of gas product stream 127 reduces from the pressure present in the molecular sieve vessel 121 to a pressure present in condenser 150.

Advantageously, by not relying on valves 128 and separate header described in system 100, the system 101 can be considered more simple and relatively easier to retrofit into an existing molecular sieve system.

It is noted that as shown in FIG. 6, if gas product stream 127 in system 101 is used to repressurize a molecular sieve vessel the pressure of gas product stream 127 used to repressurize a molecular sieve vessel would be at a lower pressure as compared to the system in 100 because the gas product stream 127 in system 101 would have passed through a pressure control valve 129 for a given molecular sieve vessel before being used to repressurize a different molecular sieve vessel.

Optionally, one or more additional pressure control valves can be used to stage the pressure reduction of gas product stream 127. For example, as shown in FIG. 6, pressure control valve 124 described above with respect to system 101 is optional if pressure reduction into condenser 150 is staged.

Following are exemplary embodiments of the present disclosure:

1. A method of regenerating molecular sieves used in an alcohol dehydration process, wherein the method comprises:

a) providing a molecular sieve system comprising two or more molecular sieve vessels (bottles), wherein each molecular sieve vessel comprises a bed of molecular sieves, wherein each molecular sieve vessel comprises an inlet and an outlet;

b) providing a gas feed stream comprising a gas mixture of alcohol and water to an inlet of a first molecular sieve vessel while discharging a gas product stream from an outlet of the first molecular sieve vessel, wherein gas mixture present in the first molecular sieve vessel during (b) is at a first pressure;

c) after (b), causing pressure of gas mixture that is present in the first molecular sieve vessel to reduce below the first pressure range to a second pressure while discharging a first gas depressurization stream from the inlet and/or outlet of the first molecular sieve vessel;

d) after (c), causing pressure of gas mixture that is present in the first molecular sieve vessel to reduce below the second pressure to a third pressure while discharging a second gas depressurization stream from the inlet of the first molecular sieve vessel; and e) after (d), causing pressure of gas mixture that is present in the first molecular sieve vessel to reduce below the third pressure to a fourth pressure while discharging a third gas depressurization stream from the inlet of the first molecular sieve vessel.

2. The method of embodiment 1, wherein the first gas depressurization stream is in fluid communication with a first heat exchanger system.

3. The method of embodiments 1 or 2, wherein the second gas depressurization stream is in fluid communication with a second heat exchanger system.

4. The method of any preceding embodiment, wherein the third gas depressurization stream is in fluid communication with a third heat exchanger system.

5. The method of embodiments 3 or 4, wherein the second heat exchanger system comprises at least one heat exchanger that condenses the second gas depressurization stream to a liquid stream that is in fluid communication with an overhead, liquid product stream from a rectifying column.

6. The method of embodiments 4 or 5, wherein the third heat exchanger system comprises at least one heat exchanger that condenses the third gas depressurization stream to a liquid stream that is transferred to a stripping section of a distillation column.

7. A method of regenerating molecular sieves used in an alcohol dehydration process, wherein the method comprises:

a) providing a molecular sieve system comprising at least first, second and third molecular sieve vessels, wherein each molecular sieve vessel comprises a bed of molecular sieves, wherein each molecular sieve vessel comprises an inlet and an outlet;

b) providing a gas feed stream comprising a gas mixture of alcohol and water to an inlet of the first molecular sieve vessel while discharging a gas product stream from the outlet of the first molecular sieve vessel, wherein gas mixture present in the first molecular sieve vessel during (b) is at a first pressure;

c) after (b), causing pressure of gas mixture that is present in the first molecular sieve vessel to reduce below the first pressure to a second pressure while discharging a first gas depressurization stream from the first molecular sieve vessel;

d) after (c), causing pressure of gas mixture that is present in the first molecular sieve vessel to reduce below the second pressure to a third pressure while discharging a second gas depressurization stream from the inlet and/or outlet of the first molecular sieve vessel to an inlet and/or an outlet of the second molecular sieve vessel, wherein an interior of the second molecular sieve vessel is at a pressure below the second pressure when the first gas depressurization stream is initially introduced into the second molecular sieve vessel; and e) after (d), causing pressure of gas mixture that is present in the first molecular sieve vessel to reduce below the third pressure to a fourth pressure while discharging a third gas depressurization stream from the inlet of the first molecular sieve vessel.

8. The method of claim 7, wherein during at least a portion of (d), the gas feed stream comprising a gas mixture of alcohol and water is continuously provided to an inlet of the third molecular sieve vessel while discharging a gas product stream from the outlet of the third molecular sieve vessel, wherein gas mixture present in the third molecular sieve vessel during the at least a portion of (d) is at a pressure in the first pressure range.

9. The method of embodiments 7 or 8, wherein the first gas depressurization stream is in fluid communication with a first heat exchanger system.

10. The method of embodiment 9, wherein the third gas depressurization stream is discharged from the inlet of the first molecular sieve vessel to a second heat exchanger system.

11. The method of embodiment 10, wherein the second heat exchanger system comprises at least one heat exchanger that condenses the third gas depressurization stream to a liquid stream that is transferred to a stripping section of a distillation column.

12. The method of any preceding embodiment, wherein the first pressure range is from 30-70 psig, and the gas feed stream is at a temperature in the range from 250 to 320 F and has an alcohol concentration in the range from 175 to 192 proof.

13. The method of any preceding embodiment, wherein the gas product stream has an alcohol concentration of at least 198 proof.

14. The method of any preceding embodiment, wherein step (c) begins at a time chosen from a predetermined time (e.g., a timer set to correspond to when sieves typically become saturated), when the concentration of alcohol in the gas product stream is 198 proof or less, and combinations thereof.

15. The method of any preceding embodiment, wherein the second pressure range is from 10 to less than 35 psig, and the first gas depressurization stream is at a temperature in the range from 250 to 320 F and has an alcohol concentration in the range from 185 to 200 proof.

16. The method of any preceding embodiment, wherein the first gas depressurization stream is in fluid communication with a first heat exchanger system, wherein the gas product stream and the first gas depressurization stream are blended together to form a blended stream, and wherein the first heat exchanger system comprises at least one heat exchanger in fluid communication with the blended stream and condenses the blended stream to a liquid.

17. The method of embodiment 16, wherein a gas product stream that discharges from each outlet of at the least first, second and third molecular sieve vessels is fluid communication with a first header pipe, wherein a first gas depressurization stream that discharges from each outlet of at the least first, second and third molecular sieve vessels is fluid communication with a second header pipe, and wherein the gas product stream in the first header pipe flows through a control valve to reduce the pressure of the gas product stream in the first header pipe from a pressure in the first pressure range to a pressure in the second pressure range prior to being blended together with the first gas depressurization stream from the second header pipe.

18. The method of embodiment 17, wherein the gas product stream that discharges from each outlet of at the least first, second and third molecular sieve vessels flows from a separate check valve and into the first header pipe, and wherein the control valve is a pressure control valve.

19. The method of embodiment 7, wherein each outlet of at the least first, second and third molecular sieve vessels is fluid communication with a header pipe, wherein a separate pressure control valve is positioned between each outlet of at the least first, second and third molecular sieve vessels and the header pipe, wherein the header pipe is in fluid communication with a first heat exchanger system, and wherein each pressure control valve reduces pressure of gas discharged from each outlet of at the least first, second and third molecular sieve vessels from a pressure in the first pressure range to a pressure in the second pressure range.

18. The method of any preceding embodiment, wherein step (d) begins at a time chosen from a predetermined time, when the concentration of alcohol in the first gas depressurization stream is 198 proof or less, when the pressure of the first gas depressurization stream reaches a predetermined pressure within the second pressure range, and combinations thereof.

20. The method of any preceding embodiment, wherein the third pressure range is from 0 to 10 psig, and the second gas depressurization stream is at a temperature in the range from 250 to 320 F. and has an alcohol concentration in the range from 175 to 198 proof.

21. The method of any preceding embodiment, wherein step (e) begins at a time chosen from a predetermined time (e.g., a timer set to a time period between 60 and 1000 seconds, or even between 90 and 200 seconds), when the concentration of alcohol in the second gas depressurization stream is 198 proof or less, when the pressure of the second gas depressurization stream reaches a predetermined pressure within the third pressure range, and combinations thereof.

22. The method of any preceding embodiment, wherein the fourth pressure range is from −14 to 0 psig, and the third gas depressurization stream is at a temperature in the range from 250 to 320 F and has an alcohol concentration in the range from 175 to 198 proof.

23. The method of any preceding embodiment, wherein the second pressure is less than the first pressure, the third pressure is less than the second pressure, and the fourth pressure is less than the third pressure.

24. The method of embodiment 7, wherein causing pressure of gas mixture that is present in the first molecular sieve vessel to reduce below the second pressure to a third pressure while discharging a second gas depressurization stream from the inlet and/or outlet of the first molecular sieve vessel to an inlet and/or an outlet of the second molecular sieve vessel comprising using one or more fluid transfer devices to transfer the second gas depressurization stream from the inlet and/or outlet of the first molecular sieve vessel to an inlet and/or an outlet of the second molecular sieve vessel.

25. The method of embodiment 7, wherein the first gas depressurization stream is discharged from the inlet or outlet of the first molecular sieve vessel.

26. The method of embodiment 7, further comprising, after (e), introducing a gas mixture into the inlet and/or outlet of the first molecular sieve vessel to increase gas pressure of gas present in the first molecular sieve vessel, wherein the gas mixture is chosen from the gas feed stream that flows through a first flow control valve and into the molecular sieve vessel, a gas product stream from another molecular sieve vessel that flows through a second flow control valve and into the molecular sieve vessel, and combinations thereof.

27. A method of regenerating molecular sieves used in an alcohol dehydration process, wherein the method comprises:
a) providing a molecular sieve system comprising two or more molecular sieve vessels, wherein each molecular sieve vessel comprises a bed of molecular sieves, wherein each molecular sieve vessel comprises an inlet and an outlet;
b) providing a gas feed stream comprising a gas mixture of alcohol and water to an inlet of a first molecular sieve vessel while discharging a gas product stream from an outlet of the first molecular sieve vessel and into a first header pipe, wherein gas mixture present in the first molecular sieve vessel during (b) is at a first pressure; and
c) after (b), causing pressure of gas mixture that is present in the first molecular sieve vessel to reduce below the first pressure range to a second pressure while discharging a first gas depressurization stream from the inlet and/or outlet of the first molecular sieve vessel into a second header pipe, wherein the gas product stream from the first header pipe and the first gas depressurization stream from the second header pipe are blended together to form a blended gas stream.

28. The method of embodiment 27, wherein a first heat exchanger system comprises at least one heat exchanger in fluid communication with the blended gas stream and condenses the blended gas stream to a liquid.

29. A method of regenerating molecular sieves used in an alcohol dehydration process, wherein the method comprises:
a) providing a molecular sieve system comprising two or more molecular sieve vessels (bottles), wherein each molecular sieve vessel comprises a bed of molecular sieves, wherein each molecular sieve vessel comprises an inlet and an outlet;
b) providing a gas feed stream comprising a gas mixture of alcohol and water to an inlet of a first molecular sieve vessel while discharging a gas product stream from an outlet of the first molecular sieve vessel, wherein gas mixture present in the first molecular sieve vessel during (b) is at a first pressure;
c) after (b), causing pressure of gas mixture that is present in the first molecular sieve vessel to reduce below the first pressure range to a second pressure while discharging a first gas depressurization stream from the inlet and/or outlet of the first molecular sieve vessel;
d) after (c), causing pressure of gas mixture that is present in the first molecular sieve vessel to reduce below the second pressure to a third pressure while discharging a second gas depressurization stream from the inlet of the first molecular sieve vessel to a pressure in the range from −14.7 to −5 psig.

What is claimed is:
1. A method of regenerating molecular sieves used in an alcohol dehydration process, wherein the method comprises:

a) providing a molecular sieve system comprising two or more molecular sieve vessels, wherein each molecular sieve vessel comprises a bed of molecular sieves, wherein each molecular sieve vessel comprises an inlet and an outlet;
b) providing a gas feed stream comprising a gas mixture of alcohol and water to an inlet of a first molecular sieve vessel while discharging a gas product stream from an outlet of the first molecular sieve vessel, wherein gas mixture present in the first molecular sieve vessel during (b) is at a first pressure;
c) after (b), causing pressure of gas mixture that is present in the first molecular sieve vessel to reduce below the first pressure to a second pressure while discharging a first gas depressurization stream from the inlet and/or outlet of the first molecular sieve vessel;
d) after (c), causing pressure of gas mixture that is present in the first molecular sieve vessel to reduce below the second pressure to a third pressure while discharging a second gas depressurization stream from the inlet of the first molecular sieve vessel; and
e) after (d), causing pressure of gas mixture that is present in the first molecular sieve vessel to reduce below the third pressure to a fourth pressure while discharging a third gas depressurization stream from the inlet of the first molecular sieve vessel.

2. The method of claim 1, wherein the first gas depressurization stream is in fluid communication with a first heat exchanger system, wherein the second gas depressurization stream is in fluid communication with a second heat exchanger system, and wherein the third gas depressurization stream is in fluid communication with a third heat exchanger system.

3. The method of claim 2, wherein the second heat exchanger system comprises at least one heat exchanger that condenses the second gas depressurization stream to a liquid stream that is in fluid communication with an overhead, liquid product stream from a rectifying column, and wherein the third heat exchanger system comprises at least one heat exchanger that condenses the third gas depressurization stream to a liquid stream that is transferred to a stripping section of a distillation column.

4. A method of regenerating molecular sieves used in an alcohol dehydration process, wherein the method comprises:
a) providing a molecular sieve system comprising at least first, second and third molecular sieve vessels, wherein each molecular sieve vessel comprises a bed of molecular sieves, wherein each molecular sieve vessel comprises an inlet and an outlet;
b) providing a gas feed stream comprising a gas mixture of alcohol and water to an inlet of the first molecular sieve vessel while discharging a gas product stream from the outlet of the first molecular sieve vessel, wherein gas mixture present in the first molecular sieve vessel during (b) is at a first pressure;
c) after (b), causing pressure of gas mixture that is present in the first molecular sieve vessel to reduce below the first pressure to a second pressure while discharging a first gas depressurization stream from the first molecular sieve vessel, wherein the first gas depressurization stream is discharged from the inlet or outlet of the first molecular sieve vessel;
d) after (c), causing pressure of gas mixture that is present in the first molecular sieve vessel to reduce below the second pressure to a third pressure while discharging a second gas depressurization stream from the inlet and/or outlet of the first molecular sieve vessel to an inlet and/or an outlet of the second molecular sieve vessel, wherein an interior of the second molecular sieve vessel is at a pressure below the second pressure when the first gas depressurization stream is initially introduced into the second molecular sieve vessel; and
e) after (d), causing pressure of gas mixture that is present in the first molecular sieve vessel to reduce below the third pressure to a fourth pressure while discharging a third gas depressurization stream from the inlet of the first molecular sieve vessel.

5. The method of claim 4, wherein the first pressure is in a pressure range, wherein during at least a portion of (d), the gas feed stream comprising a gas mixture of alcohol and water is continuously provided to an inlet of a third molecular sieve vessel while discharging a gas product stream from the outlet of the third molecular sieve vessel, wherein gas mixture present in the third molecular sieve vessel during the at least a portion of (d) is at a pressure in the pressure range.

6. The method of claim 5, wherein the first gas depressurization stream is in fluid communication with a first heat exchanger system, wherein the gas product stream from the third molecular sieve vessel and the first gas depressurization stream from the first molecular sieve vessel are blended together to form a blended stream, and wherein the first heat exchanger system comprises at least one heat exchanger in fluid communication with the blended stream and condenses the blended stream to a liquid.

7. The method of claim 6, wherein when a gas product stream discharges from each outlet of at the least first, second and third molecular sieve vessels it is fluid communication with a first header pipe, wherein when a first gas depressurization stream discharges from each outlet of at the least first, second and third molecular sieve vessels it is fluid communication with a second header pipe, and wherein the gas product stream in the first header pipe flows through a control valve to reduce the pressure of the gas product stream in the first header pipe from a pressure in the pressure range to the second pressure prior to being blended together with the first gas depressurization stream from the second header pipe.

8. The method of claim 7, wherein when the gas product stream discharges from each outlet of at the least first, second and third molecular sieve vessels each gas product stream flows through a separate check valve and into the first header pipe, and wherein the control valve is a pressure control valve.

9. The method of claim 4, wherein the first gas depressurization stream is in fluid communication with a first heat exchanger system, and wherein the third gas depressurization stream is discharged from the inlet of the first molecular sieve vessel to a second heat exchanger system.

10. The method of claim 9, wherein the second heat exchanger system comprises at least one heat exchanger that condenses the third gas depressurization stream to a liquid stream that is transferred to a stripping section of a distillation column.

11. The method of claim 4, wherein the first pressure is in a range from 30-70 psig, and the gas feed stream is at a temperature in a range from 250 to 320 F and has an alcohol concentration in a range from 175 to 192 proof, and wherein the gas product stream has an alcohol concentration of at least 198 proof.

12. The method of claim 4 wherein step (c) begins at a time chosen from a predetermined time, when the concentration of alcohol in the gas product stream is 198 proof or less, and combinations thereof, and wherein the second pressure is in a range from 10 to less than 35 psig, and the first gas depressurization stream is at a temperature in a range from 250 to 320 F and has an alcohol concentration in a range from 185 to 200 proof.

13. The method of claim 4, wherein each outlet of at the least first, second and third molecular sieve vessels is fluid communication with a header pipe, wherein a separate pressure control valve is positioned between each outlet of at the least first, second and third molecular sieve vessels and the header pipe, wherein the header pipe is in fluid communication with a first heat exchanger system, and wherein each pressure control valve reduces pressure of gas discharged from each outlet of at the least first, second and third molecular sieve vessels from a pressure in a first pressure range to a pressure in a second pressure range.

14. The method of claim 4, wherein step (d) begins at a time chosen from a predetermined time, when the concentration of alcohol in the first gas depressurization stream is 198 proof or less, when the pressure in the first molecular sieve vessel reaches a predetermined pressure, and combinations thereof, and wherein the third pressure is in a range is from 0 to 10 psig, and the second gas depressurization stream is at a temperature in a range from 250 to 320 F and has an alcohol concentration in a range from 175 to 198 proof.

15. The method of claim 4, wherein step (e) begins at a time chosen from a predetermined time, when the concentration of alcohol in the second gas depressurization stream is 198 proof or less, when the pressure in the first molecular sieve vessel reaches a predetermined pressure, and combinations thereof, and wherein the fourth pressure is in a range is from −14 to 0 psig, and the third gas depressurization stream is at a temperature in a range from 250 to 320 F and has an alcohol concentration in a range from 175 to 198 proof.

16. The method of claim 4, wherein causing pressure of gas mixture that is present in the first molecular sieve vessel to reduce below the second pressure to a third pressure while discharging a second gas depressurization stream from the inlet and/or outlet of the first molecular sieve vessel to an inlet and/or an outlet of the second molecular sieve vessel comprising using one or more fluid transfer devices to transfer the second gas depressurization stream from the inlet and/or outlet of the first molecular sieve vessel to an inlet and/or an outlet of the second molecular sieve vessel.

17. The method of claim 4, further comprising, after (e), introducing a gas mixture into the inlet and/or outlet of the first molecular sieve vessel to increase gas pressure of gas present in the first molecular sieve vessel, wherein the gas mixture is chosen from the gas feed stream that flows through a first flow control valve and into the first molecular sieve vessel, a gas product stream from another molecular sieve vessel that flows through a second flow control valve and into the first molecular sieve vessel, and combinations thereof.

18. A method of regenerating molecular sieves used in an alcohol dehydration process, wherein the method comprises:
   a) providing a molecular sieve system comprising two or more molecular sieve vessels, wherein each molecular sieve vessel comprises a bed of molecular sieves, wherein each molecular sieve vessel comprises an inlet and an outlet;
   b) providing a gas feed stream comprising a gas mixture of alcohol and water to an inlet of a first molecular sieve vessel while discharging a gas product stream from an outlet of the first molecular sieve vessel and into a first header pipe, wherein gas mixture present in the first molecular sieve vessel during (b) is at a first pressure; and
   c) after (b), causing pressure of gas mixture that is present in the first molecular sieve vessel to reduce below the first pressure to a second pressure while discharging a first gas depressurization stream from the inlet and/or outlet of the first molecular sieve vessel into a second header pipe, wherein the gas product stream from the first header pipe and the first gas depressurization stream from the second header pipe are blended together to form a blended gas stream.

19. The method of claim 18, wherein a heat exchanger system comprises at least one heat exchanger in fluid communication with the blended gas stream and condenses the blended gas stream to a liquid, wherein a portion of the at least one heat exchanger that is in in fluid communication with the blended gas stream is at a pressure is in a range from 15 to 30 psig.

20. A method of regenerating molecular sieves used in an alcohol dehydration process, wherein the method comprises:
   a) providing a molecular sieve system comprising two or more molecular sieve vessels, wherein each molecular sieve vessel comprises a bed of molecular sieves, wherein each molecular sieve vessel comprises an inlet and an outlet;
   b) providing a gas feed stream comprising a gas mixture of alcohol and water to an inlet of a first molecular sieve vessel while discharging a gas product stream from an outlet of the first molecular sieve vessel, wherein gas mixture present in the first molecular sieve vessel during (b) is at a first pressure;
   c) after (b), causing pressure of gas mixture that is present in the first molecular sieve vessel to reduce below the first pressure to a second pressure while discharging a first gas depressurization stream from the inlet and/or outlet of the first molecular sieve vessel;
   d) after (c), causing pressure of gas mixture that is present in the first molecular sieve vessel to reduce below the second pressure to a third pressure while discharging a second gas depressurization stream from the inlet of the first molecular sieve vessel to a pressure in a range from −14.7 to −9 psig.

21. The method of claim 20, wherein the pressure is in a range from −14.7 to −12 psig, and further comprising at least one vacuum eductor in fluid communication with the second gas depressurization stream to provide the pressure in in the range from −14.7 to −12 psig.

* * * * *